US005932997A

United States Patent [19]

James

[11] Patent Number: 5,932,997

[45] Date of Patent: Aug. 3, 1999

[54] BIT-WEIGHTED REGULATOR

[75] Inventor: Mark S. James, Mission Viejo, Calif.

[73] Assignee: U.S. Energy, Inc., San Clemente, Calif.

[21] Appl. No.: 09/038,721

[22] Filed: Mar. 10, 1998

Related U.S. Application Data

[63] Continuation-in-part of application No. 08/940,042, Sep. 29, 1997.

[51] Int. Cl.$^{6}$ .................................. H02J 1/00; G05F 1/00

[52] U.S. Cl. ............................................ 323/351; 315/307

[58] Field of Search .................................... 323/263, 267, 323/282, 349, 351, 361; 363/101; 315/291, 307, 312

[56] References Cited

U.S. PATENT DOCUMENTS

| | | | |
|---|---|---|---|
| 3,808,481 | 4/1974 | Rippel | 318/139 |
| 4,135,115 | 1/1979 | Abernethy et al. | 315/97 |
| 4,214,198 | 7/1980 | Schneider | 320/15 |
| 4,256,993 | 3/1981 | Morton | 315/106 |
| 4,339,690 | 7/1982 | Regan et al. | 315/97 |
| 4,434,388 | 2/1984 | Carver et al. | 315/307 |
| 4,435,670 | 3/1984 | Evans et al. | 315/58 |
| 4,464,606 | 8/1984 | Kane | 315/158 |
| 4,513,224 | 4/1985 | Thomas | 315/141 |
| 4,527,099 | 7/1985 | Capewell et al. | 315/291 |
| 4,716,357 | 12/1987 | Cooper | 323/263 |
| 4,740,878 | 4/1988 | Carter et al. | 363/63 |
| 4,766,352 | 8/1988 | Widmayer | 315/244 |
| 4,859,914 | 8/1989 | Summa | 315/354 |
| 4,870,340 | 9/1989 | Kral | 323/235 |
| 4,891,562 | 1/1990 | Nuckolls et al. | 315/277 |
| 4,965,492 | 10/1990 | Boldwyn | 315/156 |
| 5,127,464 | 7/1992 | Butler et al. | 165/14 |
| 5,252,894 | 10/1993 | Bank et al. | 315/307 |
| 5,293,098 | 3/1994 | Brownell | 315/169.3 |
| 5,373,433 | 12/1994 | Thomas | 363/43 |
| 5,442,261 | 8/1995 | Bank et al. | 315/307 |
| 5,446,641 | 8/1995 | Reynolds | 363/17 |
| 5,565,739 | 10/1996 | Brownell | 315/169.3 |

*Primary Examiner*—Adolf Deneke Berhane

*Attorney, Agent, or Firm*—Stetina Brunda Garred & Brucker

[57] ABSTRACT

The present invention discloses a low-cost voltage regulator circuit which provides at its output port, from one power source, a voltage of a set of different voltages to a load of electrical energy consuming devices, without power interruption to the load during transition time. The voltage regulator circuit includes a set of relays and a set of step-down transformers. Each of the relays receives a corresponding control signal, the magnitude of which is regulated to control the state of the associated relay. Each of the step-down transformers comprises a primary winding and a secondary winding. The secondary windings of the step-down transformers are connected in series between the positive terminal of the power source and the positive terminal of the output port, while each of the primary windings is coupled to the power source via an associated relay. Each pair of primary winding and secondary winding has a predetermined turns ratio and predetermined polarities to contribute a predetermined secondary winding voltage to the voltage across the output port.

18 Claims, 2 Drawing Sheets

BIT-WEIGHTED REGULATOR

RELATED APPLICATIONS

This is a continuation-in-part application of U.S. patent application Ser. No. 08/940,042, filed on Sep. 29, 1997, and entitled Energy Saving Lighting Controller, which is hereby incorporated by reference.

FIELD OF THE INVENTION

This invention relates generally to voltage regulator circuits, and more particularly to a low-cost voltage regulator circuit which provides a range of different voltages to a load, without power interruption to the load during voltage switching.

BACKGROUND OF THE INVENTION

Voltage regulator circuits are used in various designs of energy saving control systems which are capable of responding to the power demands of a load by providing different output voltages. Existing voltage regulator circuits use tapped isolation transformers or auto-transformers and solid-state switches. The number of taps and the voltage range between the taps determine the output voltage range and the resolution of voltage regulation. The output voltage range is typically specified as a window centered at the nominal line voltage. For example, a voltage regulator having a total range window of 20% (from −10% to +10%) with a resolution of 2% would require 10 taps and 10 solid-state AC switches.

The switching for each tap is usually done by connecting two symmetric Silicon Controlled Rectifiers (SCRS) in an anti-parallel configuration to act as an AC switch. When the current is applied by the control system to the gates of a pair of SCRs, these SCRs conduct current to connect the power to the selected tap. When the current is removed from the gates of the SCRS, the SCRs will continue to conduct until the anode current drops below the latching current setpoint. This normally occurs, in a loaded system, when the line current crosses through zero. The problem with this type of voltage regulator is that control systems are usually not sophisticated enough to make sure that a pair of SCRs are turned off before the next tap's SCRs are gated on. If two pairs of SCRs are on at the same time, the two adjacent taps will act like a low voltage winding of a step-down transformer, and a large current will flow through the SCRs causing damage. To prevent this from occurring, in many systems, there is a time delay between removing gate current from one pair of SCRs and applying a gate current to another pair of SCRs. However, this will cause a short power interruption to the load. Such power interruption can negatively affect a load of sensitive electronic systems.

The present invention addresses the above problem by providing a voltage regulator circuit which utilizes inexpensive components to perform the voltage switching function without power interruption to the load and without high current circulating through the components during the voltage switching. Furthermore, the circuit of the present invention can be easily upgraded to provide higher resolution and/or a larger window, without substantially increasing the base cost.

SUMMARY OF THE INVENTION

The present invention discloses a low-cost voltage regulator circuit which provides at its output port, from one power source, a set of different voltages to a load of electrical energy consuming devices, without power interruption to the load during transition time. The voltage regulator circuit includes a set of relays and a set of step-down transformers. Each of the relays receives a corresponding control signal, the magnitude of which is regulated to energize the associated relay. Each of the step-down transformers comprises a primary winding and a secondary winding. The secondary windings of the step-down transformers are connected in series between the positive terminal of the power source and the positive terminal of the output port, while each of the primary windings is coupled to the power source via an associated relay. Each pair of primary winding and secondary winding has a predetermined turns ratio and the primary winding has switchable polarities to contribute a predetermined secondary winding voltage and variable polarity to the voltage across the output port.

In order to change the polarity of a particular secondary winding voltage contributed by a pair of primary winding and secondary winding to the voltage across the output port, an associated relay switches terminal connections of the associated primary winding to the power source such that the associated primary winding voltage changes polarity, causing polarity of the associated secondary winding voltage to be changed. The polarity of the secondary winding determines whether the voltage provided thereby adds (boasts) or subtracts (bucks) with respect to the output voltage. The voltage adds when the secondary voltage is in phase with the line voltage.

In the preferred embodiment of the present invention, the predetermined turns ratio of each pair of primary winding and secondary winding is such that the secondary winding voltage is an integer power of two percent of the primary winding voltage.

In the preferred embodiment, in the initial state of the voltage regulator circuit, when each of the relays is not energized, the output port voltage is one percent higher than the power source voltage.

In the preferred embodiment, the different voltages are uniformly distributed within the voltage range window, and the smallest difference between two of the different voltages is two percent of the power source voltage. Thus, the output port voltage can vary within a range window centered around the value of the power source voltage, with a 2% resolution. This configuration allows the circuit to be easily upgraded to provide higher resolution and/or greater voltage range window.

The preferred embodiment can be easily modified to achieve the same range window with a 1% resolution, by the addition of a transformer having a secondary-per-primary turns ratio of 0.5% or 1:200. In such case, the different voltages are uniformly distributed within the voltage range window, and the smallest difference between two of the different voltages is one percent of the power source voltage.

In the preferred embodiment, double-pole double-throw relays are used to switch terminal connections of the associated primary windings to the power source such that the associated primary voltages change polarities. In an alternate configuration, single-pole double-throw relays can be used in conjunction with center-tapped primary windings to achieve the same result.

The voltage across the output port is determined by the power source voltage and the total voltage contribution from the secondary windings of the step-down transformers. Each pair of primary winding and secondary winding has a predetermined turns ratio and predetermined polarities to contribute a predetermined secondary winding voltage to the voltage across the output port.

A voltage regulator system is also disclosed. The system comprises a voltage regulator circuit, an optional current sensing circuit, and a control circuit. The voltage regulator circuit, in electrical communication with the power source, produces one of the different voltages at its output port in response to a set of control signals. Each of the control signals has a regulated magnitude. The combination of regulated magnitudes of the control signals determines the voltage to be produced at the output port. The voltage regulator circuit is configured to effect switching between the different voltages without power interruption to the load. The current sensing circuit, in electrical communication with the power source, measures the output current of the power source and produces a current signal. The control circuit, in electrical communication with the power source, the voltage regulator circuit and the current sensing circuit, senses a change in current demand by the load, outputs the control signals to the voltage regulator circuit, and regulates the magnitude and duration of each of the control signals in response to the sensed change in current demand, initiating the voltage switching. Alternatively, a change in line voltage, load voltage, or any other desired parameter may be used to effect the output of desired control signals. Regulating the magnitude of a control signal means turning the control signal on or off, or setting it at a value within a range.

The voltage regulator circuit of this system is the voltage regulator circuit of the present invention. It is as described above.

The current sensing circuit comprises a current transformer. The control circuit comprises a non-volatile memory for storing settings used in regulating the duration of each of the control signals. The settings are either user-defined settings or settings resulting from adaptive control algorithms. The control circuit preferably comprises a microprocessor. According to the preferred embodiment of the present invention, current sensing is performed with a current transformer. However, those skilled in the art will appreciate that various other means such as the measurement of a voltage across a shunt resistor, the use of a hall-effect sensor, etc., are likewise suitable. Further, the settings used in regulating the duration of each of the control signals may be implemented with discrete analogue and/or digital circuits, as well as microprocessors and memory.

The voltage regulator system further comprises a visual display, in electrical communication with the control circuit, for showing status of the system and a computer interface, in electrical communication with the control circuit, for receiving inputs from a user.

The voltage regulator system is preferably configured such that the voltage regulator circuit produces at its output port a voltage approximately equal to the power source voltage in the absence of the control signals, i.e., when the control signals have regulated magnitudes of approximately zero. This configuration ensures that the system is fail-safe, i.e., still operative even when the control circuit fails.

The voltage regulator circuit performs the voltage switching function without power interruption to the load and without high current circulating through the components during the voltage switching, utilizing a set of small and inexpensive step-down transformers which are rated for handling only small fractions of the full voltage and power of the power source. Since the secondary windings of the transformers remain connected to the power source during the voltage switching, there is no power interruption to the load. Additionally, since the absolute value of the current circulating through a primary winding before the switching and after the switching is only equal to a small fraction of the full rated current flowing through each of the secondary windings, the switching only involves changing the directions of the very small currents flowing through the primary windings. Thus, small and reliable relays can be used for this purpose.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE INVENTION

The detailed description set forth below in connection with the appended drawings is intended as a description of the presently preferred embodiments of the invention, and is not intended to represent the only forms in which the present invention may be constructed or utilized. The description sets forth the functions and the sequence of the steps for constructing and operating the invention in connection with the illustrated embodiment. It is to be understood, however, that the same or equivalent functions may be accomplished by different embodiments that are also intended to be encompassed within the spirit and scope of the invention.

Figure 1:
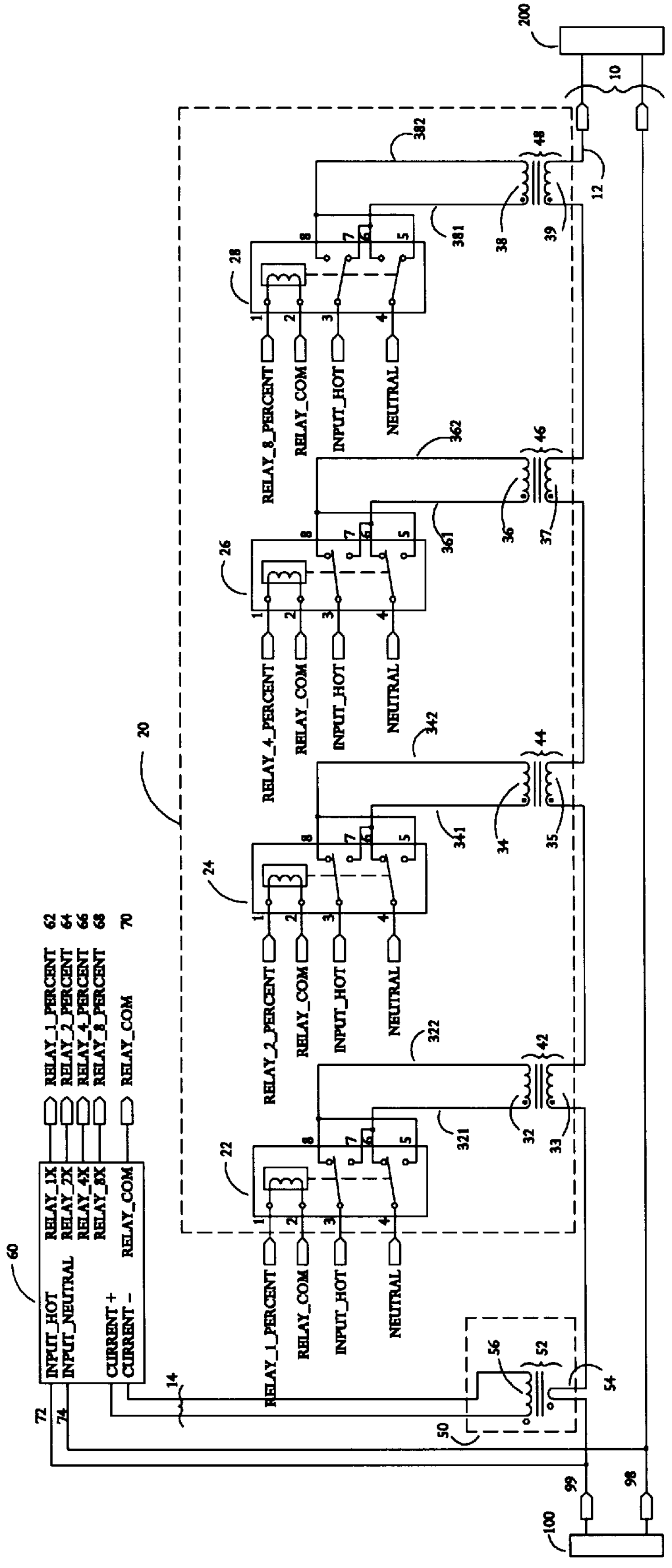
FIG. 1 is a schematic diagram of the bit-weighted regulator system of the present invention.

FIG. 1 shows a block diagram of a voltage regulator system constructed in accordance with the present invention. The voltage regulator system is comprised primarily of a voltage regulator circuit 20 in electrical communication with the power source 100, a current sensing circuit 50 connected to the positive terminal 12 of the power source 100, and a control circuit 60, in electrical communication with the voltage regulator circuit 20 and the current sensing circuit 50.

The voltage regulator circuit 20 produces a voltage of a set of different voltages at its output port 10 upon receipt of a set of control signals from the control circuit 60. In the absence of the control signals, i.e., when each of the control signals has approximately zero magnitude, the voltage regulator circuit 20 produces a voltage approximately equal to the power source 100 voltage.

The current sensing circuit 50 measures the current at terminal 99 of the power source 100 and produces a measured current signal at its output 14. An increase (or decrease) in the measured current signal indicates either an increase (or decrease) in current demand by the load 200 or an increase (or decrease) in the power source 100 voltage, or both. An increase (or decrease) in current demand by the load 200, called an increase (or decrease) in load, indicates that at least one additional electrical energy consuming device has just been turned on (or off) in the load 200.

The control circuit 60 monitors the power source 100 voltage and the measured current signal. When the control circuit 60 senses an increase (or decrease) in the measured current signal which is unrelated to an increase (or decrease) in the power source 100 voltage, this indicates an increase (or decrease) in current demand by the load 200. The control circuit 60 then outputs a set of control signals and its terminals 62, 64, 66, 68 to the voltage regulator circuit 20 and regulates the magnitude of each of these control signals in response to this sensed increase (or decrease) in the current demand. The combination of the magnitudes of the control signals, outputted at control circuit 60 terminals 62, 64, 66, 68, corresponds to one voltage in the set of the different voltages that can be outputted from the voltage regulator circuit 20.

The voltage regulator circuit 20 comprises relays 22, 24, 26, 28 and step-down transformers 42, 44, 46, 48.

Each of the relays 22, 24, 26, 28 is coupled to the power source 100 at terminals 3 and 4. Terminals 1 of the relays 22, 24, 26, 28 are connected to control circuit 60 terminals 62, 64, 66, 68, respectively, to receive the control signals. Terminals 2 of the relays 22, 24, 26, 28 are connected to control circuit 60 terminal 70, to complete the coupling with the control circuit 60.

Each of the step-down transformers 42, 44, 46, 48 comprises a primary winding and a secondary winding. The secondary windings 33, 35, 37, 39 are connected in series between the positive terminal 99 of the power source 100 and the positive terminal 12 of the output port 10. In FIG. 1, the primary windings 32, 34, 36, 38 are coupled to the power source 100 such that each pair of primary winding and secondary winding have the same polarities. It is not necessary that each pair of primary winding and secondary winding has the same polarities. Other configurations are possible.

In the initial state of the system, when the magnitudes of the control signals outputted at control circuit terminals 62, 64, 66, 68 are all equal to approximately zero, the relays 22, 24, 26, 28 are in the non-energized state. In the preferred embodiment, in the initial state, the relays 22, 24, 26, 28 are configured as described below to provide an output port 10 voltage which is 1% smaller than the power source 100 voltage.

Relay 22 is associated with transformer 42. Terminal 321 of primary winding 32 is connected to terminals 6 and 7 of relay 22. Terminal 322 of primary winding 32 is connected to terminals 5 and 8 of relay 22. In the initial state, when there is no non-zero control signal at relay 22 terminal 1, relay 22 terminal 3 is connected to relay 22 terminal 8, and relay 22 terminal 4 is connected to relay 22 terminal 6. If the predetermined turns ratio, hence the step-down ratio, of transformer 42 is n to 1, then the secondary winding 33 voltage is approximately one nth of the power source 100 voltage. In the preferred embodiment, the step-down ratio of transformer 42 is 100 to 1 and the power source 100 voltage is 120 volts AC. In the initial state, when the power source 100 voltage of 120 volts AC is applied to the primary winding 32, through relay 22 terminals 8 and 6, this causes approximately 1.2 volts AC to appear across the secondary winding 33, contributing an increase of approximately 1.2 volts AC to the voltage across the output port 10.

Relay 24 is associated with transformer 44. Terminal 341 of primary winding 34 is connected to terminals 6 and 7 of relay 24. Terminal 342 of primary winding 34 is connected to terminals 5 and 8 of relay 24. In the initial state, when there is no non-zero control signal at relay 24 terminal 1, relay 24 terminal 3 is connected to relay 24 terminal 8, and relay 24 terminal 4 is connected to relay 24 terminal 6. If the predetermined turns ratio, hence the step-down ratio, of transformer 44 is n to 1, then the secondary winding 33 voltage is approximately one nth of the power source 100 voltage. In the preferred embodiment, the step-down ratio of transformer 44 is 100 to 2 and the power source 100 voltage is 120 volts AC. In the initial state, when the power source 100 voltage of 120 volts AC is applied to the primary winding 34, through relay 24 terminals 8 and 6, this causes approximately 2.4 volts AC to appear across the secondary winding 35, contributing an increase of approximately 2.4 volts AC to the voltage across the output port 10.

Relay 26 is associated with transformer 46. Terminal 361 of primary winding 36 is connected to terminals 6 and 7 of relay 26. Terminal 362 of primary winding 36 is connected to terminals 5 and 8 of relay 26. In the initial state, when there is no non-zero control signal at relay 26 terminal 1, relay 26 terminal 3 is connected to relay 26 terminal 8, and relay 26 terminal 4 is connected to relay 26 terminal 6. If the predetermined turns ratio, hence the step-down ratio, of transformer 46 is n to 1, then the secondary winding 37 voltage is approximately one nth of the power source 100 voltage. In the preferred embodiment, the step-down ratio of transformer 46 is 100 to 4 and the power source 100 voltage is 120 volts AC. In the initial state, when the power source 100 voltage of 120 volts AC is applied to the primary winding 36, through relay 26 terminals 8 and 6, this causes approximately 4.8 volts AC to appear across the secondary winding 37, contributing an increase of approximately 4.8 volts AC to the voltage across the output port 10.

Relay 28 is associated with transformer 48. Terminal 381 of primary winding 38 is connected to terminals 6 and 7 of relay 28. Terminal 382 of primary winding 38 is connected to terminals 5 and 8 of relay 28. In the initial state, when there is no non-zero control signal at relay 28 terminal 1, relay 28 terminal 3 is connected to relay 28 terminal 7, and relay 28 terminal 4 is connected to relay 28 terminal 5. If the predetermined turns ratio, hence the step-down ratio, of transformer 48 is n to 1, then the secondary winding 39 voltage is approximately one nth of the power source 100 voltage. In the preferred embodiment, the step-down ratio of transformer 48 is 100 to 8 and the power source 100 voltage is 120 volts AC. In the initial state, when the power source 100 voltage of 120 volts AC is applied to the primary winding 38, through relay 28 terminals 7 and 5, this causes approximately 9.6 volts AC to appear across the secondary winding 39. Due to its polarity, this secondary winding 39 voltage contributes a decrease of approximately 9.6 volts AC to the voltage across the output port 10. Thus, it is clear that when the polarity of the voltage at the secondary of a given transformer is the same polarity as the line voltage, then the secondary transformer's voltage adds to the line voltage and when the polarity of the voltage of the secondary transformer is opposite the line voltage, then the voltage of the secondary transformer is subtracted from the line voltage.

The output port 10 voltage is equal to the sum of the power source 100 voltage and the voltages contributed by the secondary windings 33, 35, 37, 39. In the initial state, the secondary windings 33, 35, 37, 39 contribute +1%, +2%, +4%, −8% of the power source 100 voltage, respectively, to the output port 10 voltage. Thus, in the initial state, as shown in FIG. 1, the output port 10 voltage is equal to 99% of the power source 100 voltage. The voltage regulator circuit 20 can also be configured such that the output port 10 voltage is equal to 101% of the power source 100 voltage. It is preferable to have an output port 10 voltage approximately equal to the power source 100 voltage in the initial state, so that in case of failure of the control circuit 60, the system is still operative.

An advantage of this configuration of the voltage regulator circuit 20 is that, while each of the primary windings 32, 34, 36, 38 is rated for the full voltage of the power source 100, each of the secondary windings 33, 35, 37, 39 needs to be rated only for a small percent of the full voltage and of the full power. For example, for the transformer 42 step-down ratio of 100 to 1, the secondary winding 33 is rated for only one percent of the full power source 100 voltage. Thus, small and inexpensive transformers can be used for this purpose.

When the control circuit 60 determines that there is a change, i.e., an increase or a decrease, in the current demand by the load 200, the control circuit 60 outputs a different combination of control signal magnitudes. For example, if the control circuit 60 determines that the output port 10 voltage must be decreased from 99% to 97% of the power source 100 voltage, then the control circuit 60 outputs a nonzero control signal from its terminal 62 to relay 22 terminal 1, while keeping at zero the magnitudes of the other control signals outputted at its terminals 64, 66, 68. Upon reception of the non-zero control signal at its terminal 1, relay 22 is energized, causing its terminals 3 and 4 to be disconnected from its terminals 8 and 6, respectively, and subsequently connected to its terminals 7 and 5, respectively. This switching of relay 22 terminal connections causes the primary winding 32 voltage to change polarity. This, in turn, causes the secondary winding 33 voltage to change polarity. Consequently, the contribution of secondary winding 33 voltage to the output port 10 voltage changes from +1% to −1% of the power source 100 voltage. The voltage contributions of the secondary windings 33, 35, 37, 39 to the output port 10 voltage are now −1%, +2%, +4%, and −8%, respectively, causing the output port 10 voltage to be equal to 97% of the power source 100 voltage.

The output port 10 voltage range window achievable with this exemplary configuration of the voltage regulator circuit 20 is −15% to +15% of the power source 100 voltage. Thus, the total voltage range window is 30% of the power source 100 voltage. The different voltages that can be provided at the output port 10 are uniformly distributed within the voltage range window at a resolution of 2% of the power source 100 voltage.

In the preferred embodiment, the transformers 22, 24, 26, 28 are configured such that the absolute value of every secondary winding voltage, downstream from the power source 100, is twice the absolute value of the preceding secondary winding voltage. This configuration provides an advantage when a transformer is added to the system, as described below. If a transformer, having a secondary-per-primary turns ratio equal to half of the existing smallest secondary-per-primary turns ratio, is added to the system along with an associated relay, then the overall resolution is improved while the voltage range window is only slightly increased. For example, if a transformer having a secondary-per-primary turns ratio of 0.5%, or 1:200, is added to the voltage regulator 20 of FIG. 1, in the example above, then the overall resolution is changed from 2% to 1% of the power source 100 voltage, while the total voltage range window is increased from 30% to 31% of the power source 100 voltage. If a transformer having a secondary-per-primary turns ratio equal to twice the existing largest secondary-per-primary turns ratio is added to the system along with an associated relay, then the overall resolution remains unchanged while the voltage range window is more than doubled. For example, if a transformer having a secondary-per-primary turns ratio of 16% is added to the voltage regulator 20 of FIG. 1, in the example above, then the overall resolution remains unchanged at 2% of the power source 100 voltage while the total voltage range window is increased from 30% to 62% of the power source 100 voltage.

Another advantage of the configuration of the voltage regulator circuit 20 is that, since the secondary windings 33, 35, 37, 39 are never disconnected from terminal 99 of the power source 100, the transition between different voltages at the output port 10 is effected without power interruption to the load 200.

Switching between different voltages without power interruption to the load is an important feature of the invention. If the load 200 is comprised of fluorescent lamps or high intensity discharge lamps, a power interruption to the load 200 would cause the plasma in the lamps to quench and would require a start-up cycle at full voltage to re-heat the plasma.

Another advantage of the configuration of the voltage regulator circuit 20 is that switching from one voltage to a different voltage only requires switching at least one of the currents of the primary windings 32, 34, 36, 38. Since these currents are only small fractions (1%, 2%, 4%, and 8%, respectively, in the above example) of the full rated current, four small, thus reliable, relays can be used to implement relays 22, 24, 26, 28. Furthermore, there is no high circulating current in the system during the switching. Instead of a relay, a solid state switch can be used for the function of each of the relays 22, 24, 26, 28. However, solid state switches are more susceptible to damages by transients on the power source line than relays.

Figure 2:
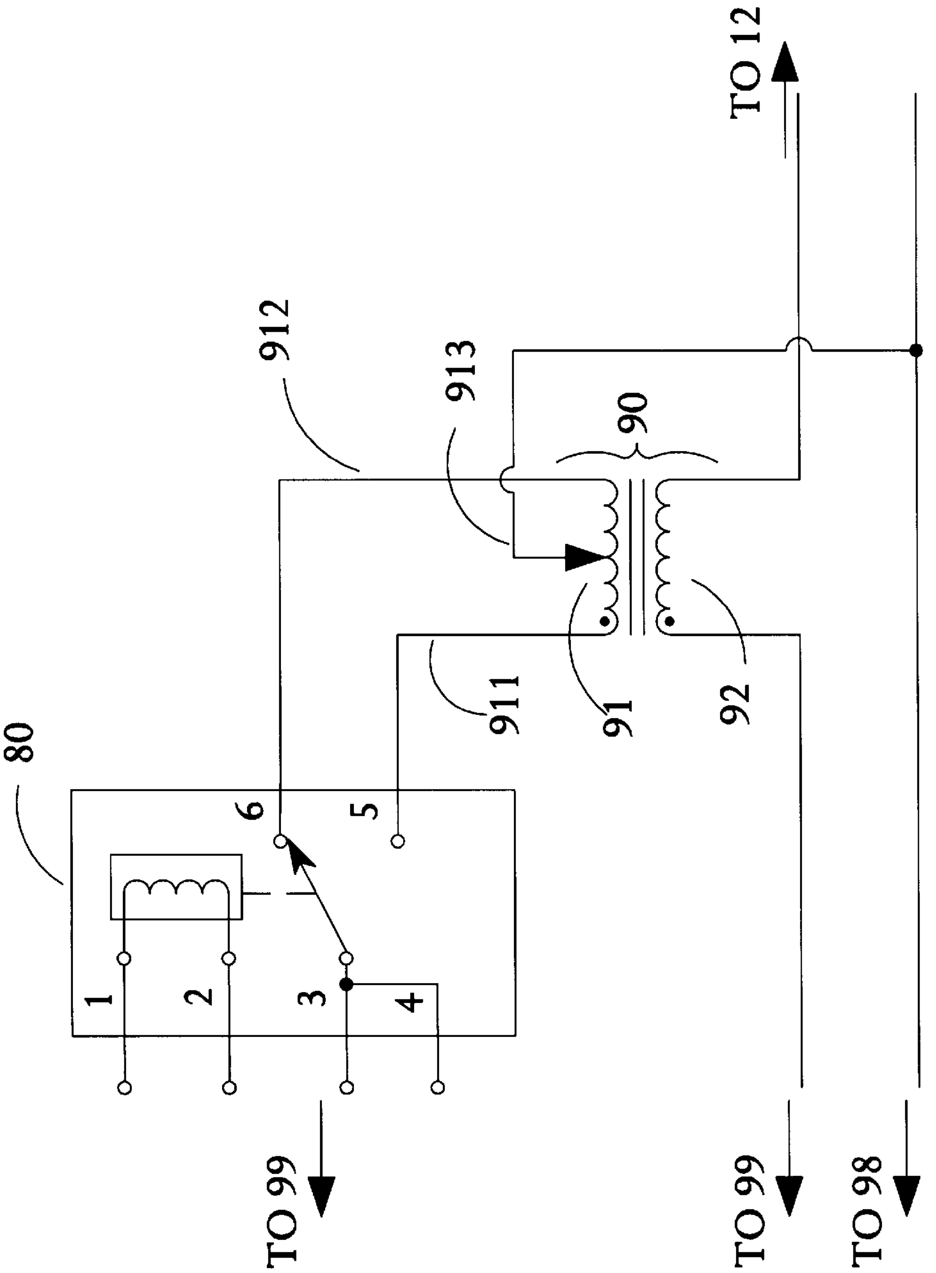
FIG. 2 is a schematic diagram of a single-pole double-throw relay paired with an associated center-tapped transformer, as used in an alternate embodiment of the voltage regulator circuit.

The voltage regulator circuit 20 can also be implemented with a set of single-pole double-throw relays and a set of associated center-tapped transformers, instead of the set of double-pole double-throw relays 22, 24, 26, 28 and the set of associated regular transformers 42, 44, 46, 48. FIG. 2 illustrates the exemplary connections of a single-pole double-throw relay 80 with a center-tapped transformer 90 for use in such an alternate embodiment. Terminal 911 of primary winding 91 connected to terminal 5 of relay 80. Terminal 912 of primary winding 91 is connected to terminal 6 of relay 91. Center tap terminal 913 of primary winding 91 is connected to the negative terminal 98 of the power source 100. Secondary winding 92 is connected in series between terminal 99 of power source 100 and terminal 12 of the output port 10. Relay 80 is coupled to the control circuit 60 at its terminals 1 and 2. Relay 80 terminal 3 is connected to relay 80 terminal 4, and to terminal 99 of power source 100. In the initial state, when there is a zero-amplitude control signal at relay 80 terminal 1, relay 80 terminal 3 is connected to relay 80 terminal 6, and relay 28 terminal 4 is connected to relay 28 terminal 5. In the initial state, when the power source 100 voltage is applied to the primary winding 91, through relay 80 terminal 6 and center tap terminal 913, this causes a voltage of the same polarity to appear across the secondary winding 92. If the predetermined turns ratio, hence the step-down ratio, of transformer 90 is 100 to 1, then the secondary winding 92 voltage is approximately one percent of the power source 100 voltage. Due to its polarity, this secondary winding 92 voltage contributes +1% of the power source 100 voltage to the voltage across the output port 10. Upon reception of a non-zero control signal at its terminal 1, relay 80 is energized, causing its terminal 3 to be disconnected from its terminal 6 and subsequently connected to its terminal 5. This switching of relay 80 terminal connections causes the primary winding 91 voltage to change polarity. This in turn, causes the secondary winding 92 voltage to change polarity. Consequently, the contribution of secondary winding 92 voltage to the output port 10 voltage changes from +1% to −1% of the power source 100 voltage.

Referring now to FIG. 1, the current sensing circuit 50 comprises a current transformer 52 which includes a primary winding 54 and a secondary winding 56. The primary winding 54 is connected to the positive terminal 99 of the power source 100. The secondary winding 56 is coupled to the control circuit 60. The current flowing through the secondary winding 56 is equal to a fraction of the current flowing out of terminal 99 and through primary winding 54, and serves as a measured current signal to the control circuit 60.

A change in the measured current signal indicates either a change in the current demand by the load 200 or a change in the power source 100 voltage, or both. A change (increase or decrease) in current demand by the load 200, called a change in load, indicates that at least one additional electrical energy consuming device has just been turned on or off in the load 200. In order to calculate a change of power due to a change in load, that is unrelated to a change caused by a variation in power source 100 voltage, the control circuit 60 is coupled to the power source 100 at terminals 72 and 74 to monitor the power source 100 voltage. When the control circuit 60 determines that the current change is due to a change in load, the control circuit 60 produces a different combination of magnitudes of control signals at terminals 62, 64, 66, 68 which are connected to terminals 1 of relays 22, 24, 26, 28, respectively.

In the presently preferred embodiment of the invention, the control circuit 60 is a microprocessor having a non-volatile memory for storing the settings used in determining the duration of the control signals, and the relation between the load current demand and the corresponding voltage to be produced at output port 10. The settings can be user-defined or resulting from adaptive control algorithms. To obtain settings determined by adaptive control algorithms, the control circuit 60 monitors the voltage and current supplied to the load 200 over a period of time. The control circuit 60 is connected to a visual display to show the status of the system, and a computer interface to receive inputs from a user. Using the computer interface which includes a keypad, a front panel and a visual display, the user can input the settings into the control circuit 60. These settings can be changed while the system is running. These settings are saved in the non-volatile memory of the microprocessor 60 so that they will be retained when the system is turned off, even for as long as ten years, and are reloaded automatically when the system is turned on again. Through the computer interface, the user can also manually control the system, running the system at any power mode within the range window at will, overriding the automatic control.

The microprocessor 60 monitors the voltage and current supplied to the load 200 during full voltage cycles and reduced voltage cycles, and calculates the amount of energy saved. The microprocessor 60 outputs to the visual display information about the system load 200 and the amount of energy saved.

The microprocessor 60 can monitor three phases of power simultaneously and control each phase independently for efficient operation of the loads. Thus, a three-phase configuration of the present invention can be implemented using three voltage regulator circuits, three current sensing circuits and one control circuit.

It is understood that the exemplary voltage regulator systems described herein and shown in the drawings represent only a presently preferred embodiments of the invention. Indeed, various modifications and additions may be made to such embodiment without departing from the spirit and scope of the invention. For example, the embodiments can be modified to provide different output port voltage in the initial state when the control signals have zero magnitudes, or to provide a different voltage range window, or to provide the same voltage range window with a different resolution. Those skilled in the art will recognize that various other configurations are equivalent and therefore likewise suitable. Thus, these and other modifications and additions may be obvious to those skilled in the art and may be implemented to adapt the present invention for use in a variety of different applications.

What is claimed is:

1. A low-cost voltage regulator circuit for providing at an output port, from one power source having a positive terminal and a negative terminal, a voltage selected from a set of different voltages, to a load including at least one electrical energy consuming device, the voltage regulator circuit being configured to effect switching between the different voltages without power interruption to the load, the circuit comprising:

a) a set of relays, each of the relays receiving an associated control signal of a set of control signals, magnitude of each of the control signals being regulated to control the state of the associated relay; and b) a set of step-down transformers, each of the step-down transformers comprising a primary winding and a secondary winding, secondary windings of the step-down transformers being connected in series between the positive terminal of the power source and the positive terminal of the output port, each of the primary windings being coupled to the power source via an associated relay, each pair of primary winding and secondary winding having a predetermined turns ratio and predetermined polarities to contribute a predetermined secondary winding voltage to the voltage across the output port;

c) wherein, to change polarity of a predetermined secondary winding voltage contributed by a pair of primary winding and secondary winding to the voltage across the output port, an associated relay switches terminal connections of the associated primary winding to the power source such that the associated primary winding voltage changes polarity, causing polarity of the associated secondary winding voltage to be changed.

2. The voltage regulator circuit as recited in claim 1 wherein the predetermined turns ratio of each pair of primary winding and secondary winding is such that the secondary winding voltage is an integer power of two percent of the primary winding voltage.

3. The voltage regulator circuit as recited in claim 1, wherein when each of the relays is not energized, the output port voltage is one percent higher than the power source voltage.

4. The voltage regulator circuit as recited in claim 1, wherein the different voltages are uniformly distributed within a voltage range window centered at the power source voltage and the smallest difference between two of said different voltages is two percent of the power source voltage.

5. The voltage regulator circuit as recited in claim 1, wherein the different voltages are uniformly distributed within a voltage range window centered at the power source voltage and the smallest difference between two of said different voltages is one percent of the power source voltage.

6. The voltage regulator circuit as recited in claim 1 wherein the set of relays comprises double-pole double-throw relays.

7. The voltage regulator circuit as recited in claim 1 wherein the set of relays comprises single-pole double-throw relays and the set of step-down transformers comprises center-tap transformers.

8. A voltage regulator system for providing, from one power source having a positive terminal and a negative terminal, a voltage of a set of different voltages to a load including at least one electrical energy consuming device, the system comprising:

a) a voltage regulator circuit, in electrical communication with the power source, for producing one of the different voltages at an output port in response to a set of control signals, each of the control signals having a regulated magnitude, combination of regulated magnitudes of the control signals determining said one voltage, said voltage regulator circuit being configured to effect switching between the different voltages without power interruption to the load;

b) a current sensing circuit, in electrical communication with the power source, for measuring output current of said power source and for producing a current signal; and c) a control circuit, in electrical communication with the power source, with the voltage regulator circuit and with the current sensing circuit, for sensing a change in current demand by the load, for outputting the control signals to the voltage regulator circuit, and for regulating the magnitude and duration of each of the control signals in response to said sensed increase in current demand.

9. The voltage regulator system as recited in claim 8 wherein the voltage regulator circuit comprises:

a) a set of relays, each of the relays being coupled to the control circuit for receiving an associated control signal of the set of control signals; and b) a set of step-down transformers, each of the step-down transformers comprising a primary winding and a secondary winding, secondary windings of the step-down transformers being connected in series between the positive terminal of the power source and the positive terminal of the output port, each of the primary windings being coupled to the power source via an associated relay, each pair of primary winding and secondary winding having a predetermined turns ratio and predetermined polarities to contribute a predetermined secondary winding voltage to the voltage across the output port;

(c) wherein, to change polarity of a predetermined secondary winding voltage contributed by a pair of primary winding and secondary winding to the voltage across the output port, an associated relay switches terminal connections of the associated primary winding to the power source such that the associated primary winding voltage changes polarity, causing polarity of the associated secondary winding voltage to be changed.

10. The voltage regulator system as recited in claim 8 wherein the current sensing circuit comprises a current transformer.

11. The voltage regulator system as recited in claim 8 wherein the control circuit comprises a non-volatile memory for storing settings used in regulating the duration of each of the control signals, said settings being selected from the group of user-defined settings and settings resulting from adaptive control algorithms.

12. The voltage regulator system as recited in claim 8 wherein the control circuit comprises a microprocessor.

13. The voltage regulator system as recited in claim 8 further comprises:

a) a visual display, in electrical communication with the control circuit, for showing status of the system; and b) a computer interface, in electrical communication with the control circuit, for receiving inputs from a user.

14. The voltage regulator system as recited in claim 8 wherein the voltage regulator circuit produces a voltage of the different voltages at the output port upon reception of the control signals having regulated magnitudes of approximately zero, said voltage being approximately equal to the power source voltage.

15. A method for providing, from one power source, one of a plurality of different voltages to a load including at least one electrical energy consuming device, wherein switching between the different voltages is effected without power interruption to said load, the method comprising:

a) measuring current being supplied to the load from a terminal of a voltage regulator circuit, said voltage regulator circuit comprising a set of relays and a set of step-down transformers, each of the step-down transformers being associated with one of the relays and including a primary winding and a secondary winding, secondary windings of the step-down transformers being connected in series between the positive terminal of the power source and the positive terminal of the output port, each of the primary windings being coupled to the power source via an associated relay, each pair of primary winding and secondary winding having a predetermined turns ratio and predetermined polarities to contribute a predetermined secondary winding voltage to the voltage across the output port;

b) producing a measured current signal;

c) applying the measured current signal to a control circuit to determine a current demand of the load;

d) outputting a set of control signals for a specified duration from the control circuit, each of the control signals being associated with a relay of the voltage regulator circuit;

e) regulating the magnitude of each of the control signals, in response to said voltage demand, to form a combination of regulated magnitudes of the control signals, said combination corresponding to one of the different voltages;

f) applying each of the control signals of regulated magnitudes to an associated relay of the voltage regulator circuit; and g) producing said one of the different voltages, for the specified duration, at the output port of the voltage regulator circuit.

16. The method as recited in claim 15 further includes the step of monitoring the power source voltage to determine the voltage demand level by the load.

17. The method as recited in claim 15 wherein, to change polarity of a predetermined secondary winding voltage contributed by a pair of primary winding and secondary winding to the voltage across the output port, an associated relay switches terminal connections of the associated primary winding to the power source such that the associated primary winding voltage changes polarity, causing polarity of the associated secondary winding voltage to be changed.

18. The method as recited in claim 15 wherein the step of regulating the magnitude of each of the control signals in response to the load current demand comprises the step of reducing the magnitude of at least one of the control signals to approximately zero.

* * * * *